United States Patent
Cortina-Ortega et al.

(10) Patent No.: US 8,468,776 B2
(45) Date of Patent: Jun. 25, 2013

(54) FLANGE FOR WIND POWER GENERATORS

(75) Inventors: Jose Pablo Cortina-Ortega, Col. Paseo de las Lomas (MX); Alejandro Cortina-Cordero, Col. Paseo de las Lomas (MX); Jose Pablo Cortina-Cordero, Col. Paseo de las Lomas (MX)

(73) Assignee: Cortina Innovations S.A. de C.V., Colonia Paseo de las Lomas (MX)

( * ) Notice: Subject to any disclaimer, the term of this patent is extended or adjusted under 35 U.S.C. 154(b) by 66 days.

(21) Appl. No.: 13/160,446

(22) Filed: Jun. 14, 2011

(65) Prior Publication Data

US 2011/0308186 A1    Dec. 22, 2011

Related U.S. Application Data

(60) Provisional application No. 61/355,530, filed on Jun. 16, 2010.

(51) Int. Cl.
*E04C 3/00*    (2006.01)

(52) U.S. Cl.
USPC .............. 52/843; 52/831; 52/834; 52/835; 52/841; 52/844

(58) Field of Classification Search
USPC .......... 52/578, 651.01, 831, 843, 834, 835, 52/841, 844, 848
See application file for complete search history.

(56) References Cited

U.S. PATENT DOCUMENTS

| | | | | |
|---|---|---|---|---|
| 5,285,614 A * | 2/1994 | Fouad | | 52/848 |
| 5,513,477 A * | 5/1996 | Farber | | 52/848 |
| 5,675,956 A * | 10/1997 | Nevin | | 52/848 |
| 5,826,387 A * | 10/1998 | Henderson et al. | | 52/295 |
| 6,167,673 B1 * | 1/2001 | Fournier | | 52/848 |
| 6,446,408 B1 * | 9/2002 | Gordin et al. | | 52/632 |
| 7,096,639 B2 | 8/2006 | Wobben | | |
| 7,160,085 B2 | 1/2007 | de Roest | | |
| 7,276,808 B2 * | 10/2007 | Weitkamp et al. | | 290/55 |
| 7,343,718 B2 * | 3/2008 | Foust et al. | | 52/745.17 |
| 7,739,843 B2 * | 6/2010 | Cortina-Cordero | | 52/223.5 |
| 7,752,825 B2 * | 7/2010 | Wobben | | 52/848 |
| 7,805,895 B2 * | 10/2010 | Kristensen | | 52/169.9 |
| 8,146,323 B1 * | 4/2012 | Tooman | | 52/745.04 |
| 8,307,593 B2 * | 11/2012 | Bagepalli | | 52/223.5 |
| 8,359,798 B2 * | 1/2013 | Armbrecht et al. | | 52/297 |
| 2004/0098935 A1 * | 5/2004 | Henderson | | 52/296 |
| 2006/0048471 A1 * | 3/2006 | Lee | | 52/296 |
| 2006/0267348 A1 * | 11/2006 | Weitkamp et al. | | 290/55 |
| 2007/0251187 A1 * | 11/2007 | Schiffer et al. | | 52/741.14 |
| 2008/0209842 A1 * | 9/2008 | Montaner Fraguet et al. | | 52/651.07 |

(Continued)

*Primary Examiner* — Mark Wendell

(74) *Attorney, Agent, or Firm* — Charter IP, LLC; Matthew J. Lattig

(57) ABSTRACT

In a flange to adapt a wind power generator to a pre-stressed concrete tower, the flange includes an annular tapered pre-stressed concrete shell having a bulging which inwardly protrudes toward a central axis of the flange, and a steel component to be embedded within the pre-stressed concrete shell. The bulging includes a horizontal flat surface for settling the steel component. The steel component includes an annular tapered body having an upper and lower end, a plurality of vertical and radially extended fins joined to an external face of the steel component, a connecting ring joined to the body upper end and including a plurality of holes for introducing bolts to join the wind power generator, and an annular base joined to the body lower end, which is settled on the bulging.

12 Claims, 4 Drawing Sheets

U.S. PATENT DOCUMENTS

2010/0132282 A1* 6/2010 Voss .............................. 52/223.5
2010/0226785 A1* 9/2010 Livingston et al. ....... 416/244 R
2010/0257811 A1* 10/2010 Jakubowski .................... 52/700
2011/0278850 A1* 11/2011 Murata ........................... 290/55

* cited by examiner

FLANGE FOR WIND POWER GENERATORS

PRIORITY STATEMENT

The present application claims the benefit under 35 U.S.C. §119(e) of U.S. Provisional Patent Application Ser. No. 61/355,530 to the inventors, filed Jun. 16, 2010 and entitled "FLANGE FOR WIND POWER GENERATORS", the entire contents of which is hereby incorporated by reference herein.

BACKGROUND

1. Field.

Example embodiments in general relate to a flange for joining a wind power generator to a pole structure, and more particularly to a flange for joining a wind power generator to a pre-stressed concrete tower, as well as to a flange for joining a heliostatic collector to a pre-stressed concrete tower.

2. Related Art

The increasing demand of energy from clean and non-contaminant sources has led to the development of off shore and inshore, wind power and heliostatic generators. Towers made of steel tube have been the typical solution to date. However, higher capacity multi-megawatt nacelles demand taller and stronger towers. Thus, pre-stressed concrete towers have been developed in an effort to handle these higher loads.

Where previously wind power generators of 2.75 Mega-Watts (MW) and 3.6 MW of off-shore applications mounted on poles of 75 m were commonly used, increased sizes are now being seen; moving to wind power generators of 2 Giga Watts (GW) mounted in concrete pre-stressed towers of 110 m and taller. These concrete pre-stressed towers have a higher resistance to the wind and can better support the corrosion and nacelle weight when compared to the poles made of steel.

However, the connection of the concrete tower with the nacelle or a steel tube is done with a composite concrete-steel transition segment. Accordingly, performance problems can surface by the use of two different materials subjected to vibration and fatigue loads.

Intermediate bolted flange connections on steel towers have already been tested in the field for years. These flanges are usually mounted on the top of the concrete tower, welded to the upper end of the metallic reinforcing rods of the concrete pole or tower. The flange is under a high wind stress and can cause the rupture of the welded joints, damage to the concrete tower tip and consequent collapse of the nacelle.

SUMMARY

An example embodiment is directed to a flange to adapt a wind power generator to a pre-stressed concrete tower. The flange includes an annular tapered pre-stressed concrete shell having a bulging which inwardly protrudes toward a central axis of the flange, and a steel component to be embedded within the pre-stressed concrete shell. The bulging includes a horizontal flat surface for settling the steel component. The steel component includes an annular tapered body having an upper and lower end, a plurality of vertical and radially extended fins joined to an external face of the steel component, a connecting ring joined to the body upper end and including a plurality of holes for introducing bolts to join the wind power generator, and an annular base joined to the body lower end, which is settled on the bulging.

Another example embodiment is directed to a flange for joining a wind power generator to a pole structure. The flange includes a pre-stressed concrete shell having an annular tapered body with a body lower end diameter greater than a body upper end diameter, and a steel component arranged within the concrete shell. The steel component has a body shaped to the annular taper of the shell and has an annular base as its body lower end and a connecting ring joined to its body upper end. The connecting ring includes a plurality of holes for introducing bolts to join the wind power generator. The concrete shell includes a bulging which inwardly protrudes toward a central axis of the flange, the annular base of the steel component settling on the bulging.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus do not limit the example embodiments.

DETAILED DESCRIPTION

As to be shown in more detail hereafter, the example embodiments provide a flange joint for joining the nacelle to a pre-stressed concrete tower or pole. The example flange can prevent rupture of the welded joints and damage to the concrete tower tip of the tower.

Figure 1:
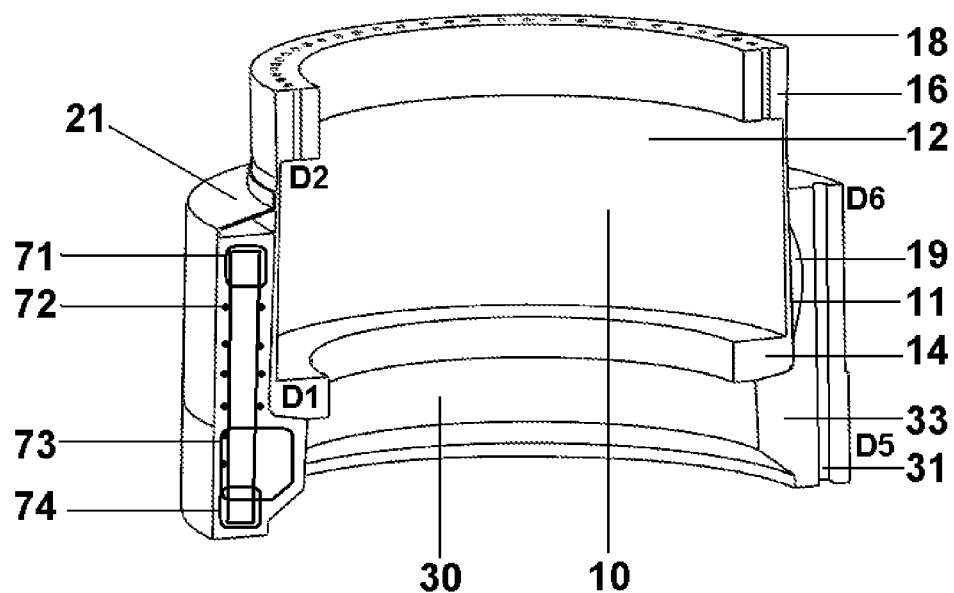
FIG. 1 illustrates a cut open isometric section of the tower flange with its components.

FIG. 1 illustrates a cut open isometric section of the tower flange with its components. Referring to FIG. 1, the flange includes a steel component 10 and a concrete shell 30 that prevents expansion of the steel component 10, resulting in a metallic flange having an added strength provided for the shell of reinforced and post-tensioned concrete. This added concrete shell provides extra strength and substantially reduces local buckling to the steel component 10 as compared to the steel component 10 alone.

As shown in FIG. 1, the steel component 10 includes a body 12 consisting of a tapered annular body having a lower end of a diameter D1 and an upper end of a diameter D2, the diameter D1 greater than the diameter D2.

The body 12 includes a plurality of radially extended vertical side fins 19. The vertical side fins 19 are designed for torsion and concrete adherence; the fins 19 are welded intermittently through welding 11 to the body 12 of the steel component 10.

In the upper end of the body 12, the steel component 10 includes a connecting ring 16 having a plurality of holes 18 through which bolts (not shown) are introduced in order to join the wind power generator (nacelle) to the flange, which in turn is joined to the concrete tower.

The flange also includes an annular base 14 for settling the steel component 10. In the lower end of the steel component 10, the annular base 14 provides a flat surface, facing downward.

The connecting ring 16 and the annular base 14 are integral to the body of the steel component 10; they can be welded to the body 12, or they can be casted in one piece.

The flat surface of the annular base 14 optionally includes a plurality of lower radial fins, welded or molded on the annular base 14, which are similar to the vertical side fins 19 intended to increase the adherence and fixation of the steel component 10 to the concrete shell 30.

The concrete shell 30 has an annular tapered body, having a lower end of a diameter D5 and an upper end of a diameter D6, the diameter D5 greater than the diameter D6. The concrete shell 30 includes mild reinforcing steel parts 71, 72, 73 and 74.

The concrete shell 30 includes a bulging 33 which inwardly protrudes toward a central axis of the annular concrete shell 30. The bulging 33 provides a horizontal flat surface, upwardly oriented to set up the annular base 14 of the steel component 10.

Likewise, the concrete shell 30 includes ducts 31 for introducing pre-stressing strands (not shown) to join the concrete shell 30 of the flange to a concrete pre-stressed tower which will support the wind power generator or nacelle, or receiver in the case of an hello static installation. The pre-stressing strands or tendons supporting the flange of the example embodiment can be attached directly to the foundations of the pre-stressed concrete tower, for example.

Figure 2:
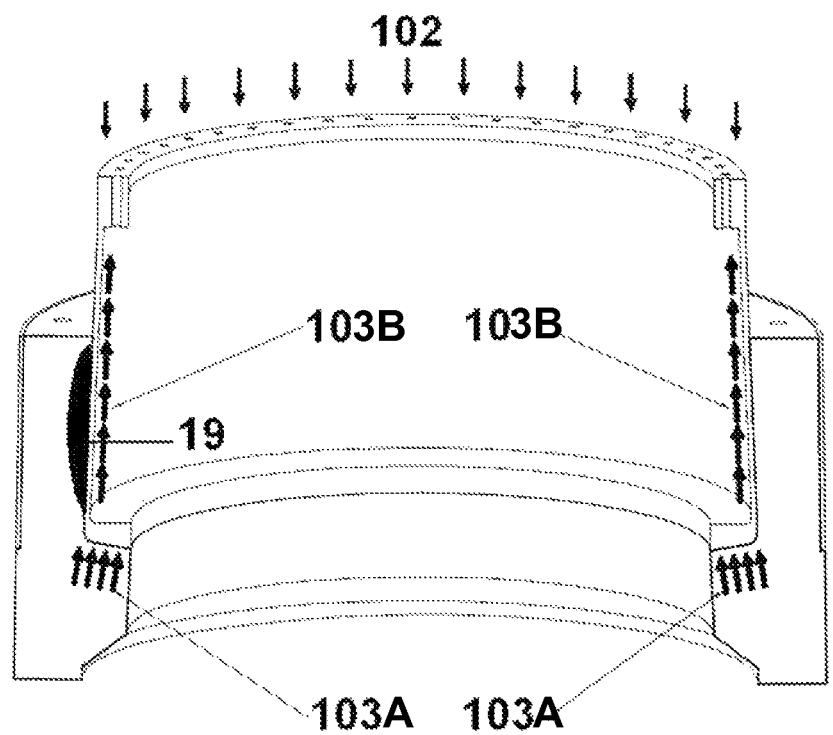
FIG. 2 is a schematic diagram representation of acting and reacting forces on the tower flange due to gravity and nacelle weight.

FIG. 2 is a schematic diagram representation of acting and reacting forces on the tower flange due to gravity and nacelle weight. In FIG. 2, there is a schematic acting 102 and reacting (103a concrete shell and 103b steel component) forces representation on the tower flange due to gravity and nacelle weight. With the flange of the example embodiment, the steel component 10 and nacelle joined are prevented from moving along the upward and downward axial directions. Axial downward displacement is prevented by the bulging 33 supporting the annular base 14, while axial upward displacement is prevented by the tapered pre-stressed concrete shell 30, which maintains the steel component 10 settled.

In addition, the vertical side fins 19 provide an additional support to the steel component 10 to prevent axial displacement. The vertically extended fins 19 are formed so that they are widened in the center and thin close to the ends. In the figures the vertical side fins 19 are of a circular segment form.

Figure 3:
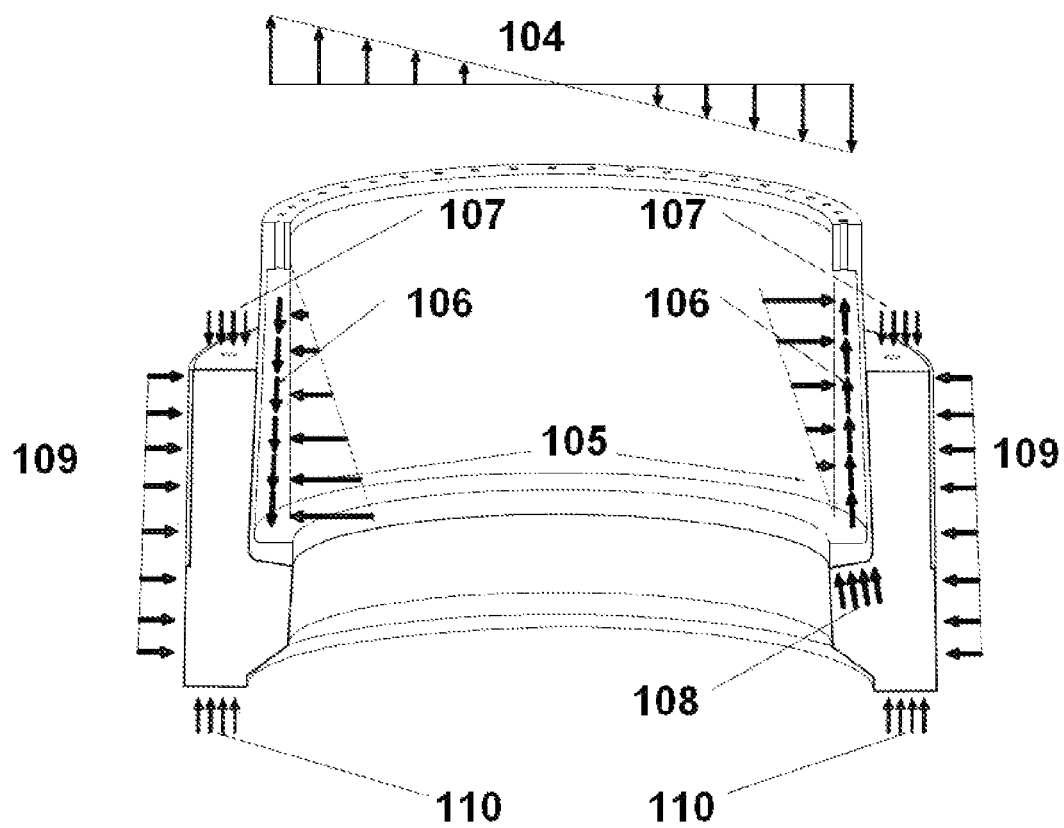
FIG. 3 is a schematic diagram representation of acting and reacting forces representation on the tower flange due to bending moments.

FIG. 3 is a schematic diagram representation of acting and reacting forces representation on the tower flange due to bending moments. In FIG. 3, there are shown schematic acting 104, 105 and reacting 106, 107, 108, 109 and 110 forces representation on the tower flange due to bending moments. Due to the fact that the wind power generator or nacelle during operation is mainly subject to the wind force in one direction, the tower and flange must support bending movements. According to the example embodiments, the steel component 10 and the nacelle attached thereto are prevented from bending, as well as from moving along the radial direction of the tower.

The above is due to the fact that the pre-stressed concrete body works as a shell for the steel component 10. The steel component 10 and the concrete shell 30 are designed to resist the shearing stress due to the wind force at the heights of the nacelle. Moreover, the structural steel reinforcement and the pre-stressing strands contribute to hold the steel component 10 firmly joined to the concrete shell 30, and the whole flange and nacelle to the concrete tower.

Figure 4:
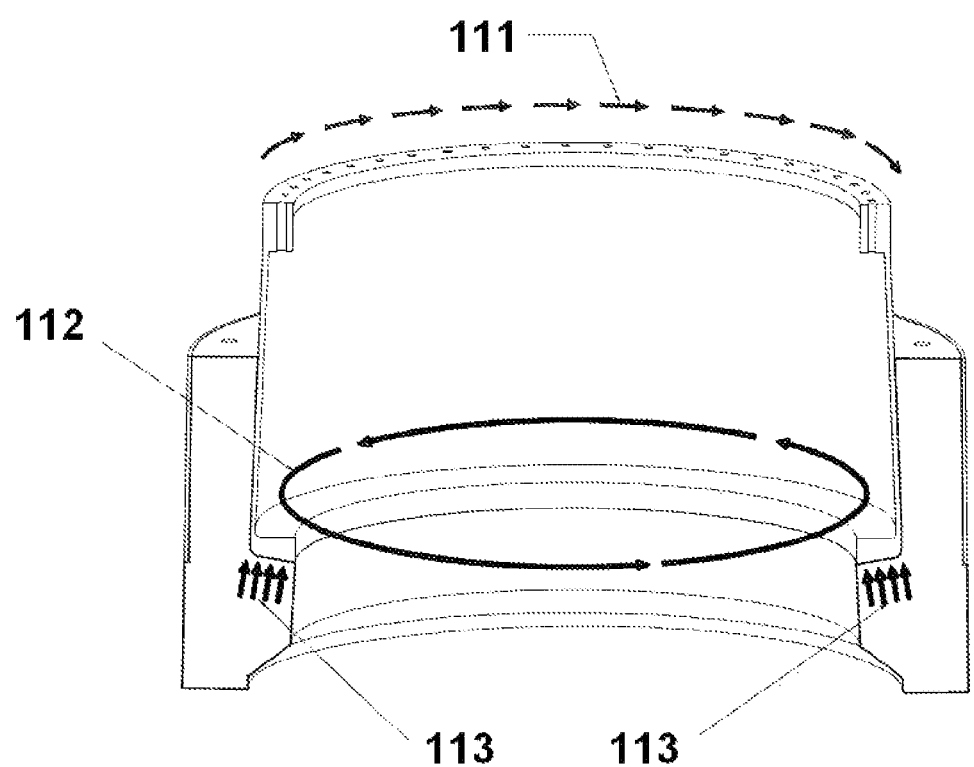
FIG. 4 is a schematic diagram representation of acting and reacting forces representation on the tower flange due to torsion.

FIG. 4 is a schematic diagram representation of acting and reacting forces representation on the tower flange due to torsion. In FIG. 4 there is a schematic acting torsion force 111 and reacting forces (112 and 113) representation on the tower flange due to torsion. With the flange of the example embodiments, the steel component 10 and the nacelle are prevented from rotating around of the flange and tower axis. The vertically extended side fins 19 engage the steel component 10 with the concrete shell 30. The lower and lateral fins are embedded within the concrete, when the concrete solidifies the side fins 19 remain immersed within the concrete, thus blocking the angular movement of the steel component 10 by preventing the external surfaces of the steel component to slide with respect to the adjacent internal surfaces of the concrete shell 30. The annular base 14 optionally includes fins or downwardly extending fins; these also prevent the angular movement of the steel component 10 due to torsion.

The design of the example flange allows that the main shears are absorbed by the steel component 10 and eventually transferred to the concrete shell 30.

The flange in accordance with the example embodiments can optionally include a cover, to protect the pre-stressing strands against raining, snow and other weather conditions. The cover 21 shown in FIG. 1 may be laterally fixed to the steel component 10 and covers the top of the concrete shell 30.

In another embodiment, the steel component 10 may include structured beams joined to the internal face of the steel component 10 to provide an additional support to the steel component.

Example

A structural analysis of the tower tip was done employing Solidworks™ (Dassault Systèmes Corp.). Solidworks™ is software that integrates a broad range of mechanical CAD, design validation and simulation in FEA (Finite Element Analysis).

FIGS. 2 to 4 schematically depict the active and reactive forces that the flange must resist. These are more thoroughly analyzed employing finite element models.

The characteristic tower top loads have to be simulated in the finite element models. In terms of the test, for sake of simplification, only the maximum loads were employed, 50% of them given statically by pulling force of the Dywidag bars and the rest by additional force induced by the rotation of the machine. These results of the analysis are shown in (Table 1).

TABLE 1

Static and machine load distribution

| Force | Max Load | Statically applied | Rotating machine applied |
|---|---|---|---|
| Fy (kN) | 260 | 130 | 130 |
| Mx (kN-m) | 2370 | 1185 | 1185 |
| Mz (kN-m) | 1340 | 670 | 670 |

Although the vibration machine rotational speed can be adjusted, an initial set of 2.2 revolutions/second was established for means of testing and reproducing the necessary forces. This information provided the following number of cycles: (2.2 cycles/s)(60 s/min)(60 min/hour)(24 hours/day)=190,080 cycles per day.

Considering that the mean fatigue load was applied 107 cycles according to Table 1, the machine must operate continuously for a determined number of days:

Necessary days of operation=(10,000,000 cycles)/(190,080 cycles/day)=52 days.

In order to have a margin of time, it may be concluded that the full prototype test would be finished within a period of 60 days, or 2 months.

The materials employed in the tower with its mechanical properties are the following:

a) Concrete (HPC but not HSC) 50 MPa Cement Type I: f'c$_{28}$=35 MPa for the prototype base. Cement type II; E$_c$=4,400√f'c (MPa) according to real values in Mexico (RCDF 04).

According to the durability design, the concrete mix design was as follows:

Maximum aggregate size=19 mm;
Maximum water/cement ratio=0.45;
(Duramax™ by CEMEX™ or similar);

Admixtures using aggregates with well graded compactness, less creep.

b) Pre-Stressed Steel:
Tendon tensile strength: f$_{pu}$=270 KSI (1,860 MPa);
(tendons 0.6" diameter with 7 wire Tow relaxation strands);
E$_S$=196,500 MPa;
Effective tendon tension stress: f$_{se}$=1,100 MPa.

c) Mild Reinforcing Steel:
Conventional reinforcing steel with f$_y$=420 MPa and E$_S$=200,000 MPa.

The method used for the fatigue studies is based on a linear damage hypothesis according to Palmgren Miner (PM). The individual damages by design provisions can be accumulated to arrive at the total damage predicted; total damage shall be less than 1.0 for all components.

For all fatigue checks of concrete compressive stresses the actual mean stress level is required for a set of grouped number of cycles because the SN curves and their knee points are a function of the mean level of stress.

Since the static studies done with the scale loads prove that the stresses fall below the allowed ranges in the SN Fatigue Loads for steel and for concrete, it can be concluded that the example flange of the example embodiments can without problem handle 100,000,000 fatigue load cycles in its 20 years lifespan.

If the stress is below, the endurance limit or fatigue limit, the example flange has effectively infinite life.

Test Setup Description

A full-scale test setup reproduces the accurate internal load distribution and the stress-strain level in the specimen by means of a combination of static loads applied with an actuator and cables in addition to an eccentric mass vibrator which reproduces the frequency of the nacelle and its components. The eccentric vibration machine provides the "peaks" necessary to achieve the maximum force, besides the necessary number of cycles to induce a fatigue process into the prototype.

The segment was precast in the test site. The footing where the segment was seated and post-tensioned is designed especially to have a joint reproducing the connection with the rest of the tower. The connection is joined with epoxy cement before post-tensioning. To do that, the footing has an integrated reinforced concrete cylinder which will allow the post-tensioning of the cables and an inspection opening. The footing is designed with a known soil reaction coefficient and the different loads created with the test.

The applied forces are combined in a realistic manner according to the information provided by the turbine manufacturer.

The test setup contains five columns arranged in the shape of a pentagon where the static forces can be applied in any position. This gives flexibility to arrange any stress combination. The lateral force is provided by the tensioning of horizontal cables.

The document "Synchronized Vibration Generators for Dynamic Tests of Full-Scale Structures (1962)" by D. E. Hudson, a report of a research conducted by the California Institute of Technology, specifies the characteristics of eccentric mass vibration machinery to induce the specified forces by means of variations of mass in the machine, as well as changing the speed in the revolutions. Applications of this type of machinery are reviewed in recent references for structural dynamics such as "Dynamics of Structures" from Anil K. Chopra.

Loads Considered.

Several load cases are considered and combined. The main solicitations are:

a) Vertical loads including pre-stressing (postensioning) and nacelle weight,
b) Horizontal loads including wind thrust, sudden extreme stop of blades and earthquake,
c) Torsion created by the blades,
d) Bending moment due to nacelle operation and eccentricities,
e) Vibrations due to de rotor operation.

Instrumentation and Measurements.

The specimen is instrumented at two scales: materials and structure. The material variables to measure included strain on the metal and concrete surfaces internal and external by means of strain gages. The structure variables to measure included displacements of the structure by means of LVDTs (Linear Variable Differential Transformer), and accelerations by means of accelerometers.

Experimental Results

Several packages of results were analyzed at different stages of the test. The results were compared and correlated to those obtained previously with FEM.

Test Failure Criteria.

Several reviews of the properties of concrete in both tension and compression under dynamic loading have been completed. It has been shown that fatigue capacity of concrete is related to the dynamic properties of concrete in tension. That is why a tension failure criteria is proposed at two scales on the specimen.

The first one regards the material scale where an eventually macro crack in the concrete specimen can be a failure criteria. For the meso scale (material scale) it is common to admit that an opened crack with more of 2 mm width is a macro crack.

The second scale is established at the scale of the structure, where a loss of stiffness will be a parameter of damage taking into account the global amount of microcracks in the concrete specimen.

Interface Description

The interface/adapter tip is basically conformed of a "short" section of the typical top section of a regular tubular steel tower that is confined inside a reinforced and post-tensioned concrete hollow cone, preventing the "trapped" steel section from movement without the need of fatigue prone welded fins to take stresses. The steel section is made of the already designed and tested top flange and shell fin of the OEM with an added bottom flange similar to an intermediate flange on a regular steel tower and welded with the same approved specs.

Results

The flange was subject to a full-scale test which has been previously successfully analyzed for loading and fatigue by means of the Finite Element Method (FEM). The full-scale test has demonstrated how successfully the flange meets the structural performance requirements and it is extremely important as it tests all combined relationships of the critical structural elements in a most realistic manner.

Fatigue issues are reduced by imitating the behavior of a regular steel flange with full perimetral welding preventing force concentrations. The confined concrete between the interior and exterior shells guarantees compression distribution from the post-tensioning anchors. Additionally, production of steel sections is standard with respect to those for regular steel towers. Further, overall production of the complete interface is believed to be easier. The concrete tapering further encompasses the steel component 10, thus preventing axial displacement, and the tendon ducts have a straight trajectory, thus preventing friction losses.

The tower interior is similar to that of a regular steel tower (no bottle neck from concrete closing in), which allows freedom to design location and platform size, equipment and ladder. Additionally, the wider concrete section increases tower stability, and the tower section at tip clearance does not increase. Further, it has been shown that the steel section does not interfere with rigging equipment.

The example embodiments being thus described, it will be obvious that the same may be varied in many ways. Such variations are not to be regarded as a departure from the spirit and scope of the example embodiments, and all such modifications as would be obvious to one skilled in the art are to be included within the scope of the following claims.

We claim:

1. A flange connecting a wind power generator to a pre-stressed concrete tower comprising:
    an annular tapered pre-stressed concrete shell having a bulging which inwardly protrudes toward a central axis of the flange, and
    a steel component substantially embedded within the pre-stressed concrete shell, wherein the bulging includes a horizontal flat surface settling the steel component, the steel component including:
        an annular tapered body substantially embedded in the concrete shell and having an upper and lower end,
        a plurality of vertical and radially extended fins joined to an external face of the steel component;
        a connecting ring joined to the body upper end and including a plurality of holes for receiving bolts to join the wind power generator, and
        an annular base joined to the body lower end and completely embedded within the concrete shell, which is settled on the bulging.

2. The flange of claim 1, wherein the fins are configured in a circular segment shape.

3. The flange of claim 1, further comprising a cover.

4. The flange of claim 1, wherein at least one of the annular base and connecting ring are integral to the body of the steel component.

5. The flange of claim 1, wherein the annular base further includes radially extending lower fins joined to a lower surface of the annular base.

6. The flange of claim 1, wherein the steel component further includes structured beams joined to an internal face thereof.

7. A flange for joining a wind power generator to a pole structure, comprising:
    a pre-stressed concrete shell having an annular tapered body with a body lower end diameter greater than a body upper end diameter,
    a steel component arranged substantially within the concrete shell, the steel component having a body shaped to the annular taper of the shell and having an annular base as its body lower end and completely embedded within the concrete shell, and a connecting ring forming its body upper end, the connecting ring including a plurality of holes for receiving bolts to join the wind power generator,
    wherein the concrete shell includes a bulging at its lower end which inwardly protrudes toward a central axis of the flange, the embedded annular base of the steel component settling on the bulging.

8. The flange of claim 7, wherein a part of the bulging includes a flat horizontal surface on which rests the annular base of the steel component.

9. The flange of claim 7, further comprising a plurality of vertical and radially extending fins joined to an external face of the steel component.

10. The flange of claim 9, wherein the fins are configured in a circular segment shape.

11. The flange of claim 7, further comprising a cover.

12. The flange of claim 7, wherein at least one of the annular base and connecting ring are integral to the body of the steel component.

* * * * *